INVENTORS
Leonard C. Hooper
Howard E. Mathes
Richard A. Schaeffer

BY *Fredrick H. Brown*
ATTORNEY

INVENTORS
Leonard C. Hooper
Howard E. Mathes
Richard A. Schaeffer

BY *Fredrick H. Braun*
ATTORNEY

Oct. 5, 1971    L. C. HOOPER ETAL    3,609,939
APPARATUS FOR THE METERING AND LOADING OF ARTICLES
OF SUBSTANTIALLY UNIFORM SIZE AND SHAPE
Filed June 2, 1970    5 Sheets-Sheet 3

INVENTORS
Leonard C. Hooper
Howard E. Mathes
Richard A. Schaeffer

BY Fredrick H. Brown
ATTORNEY

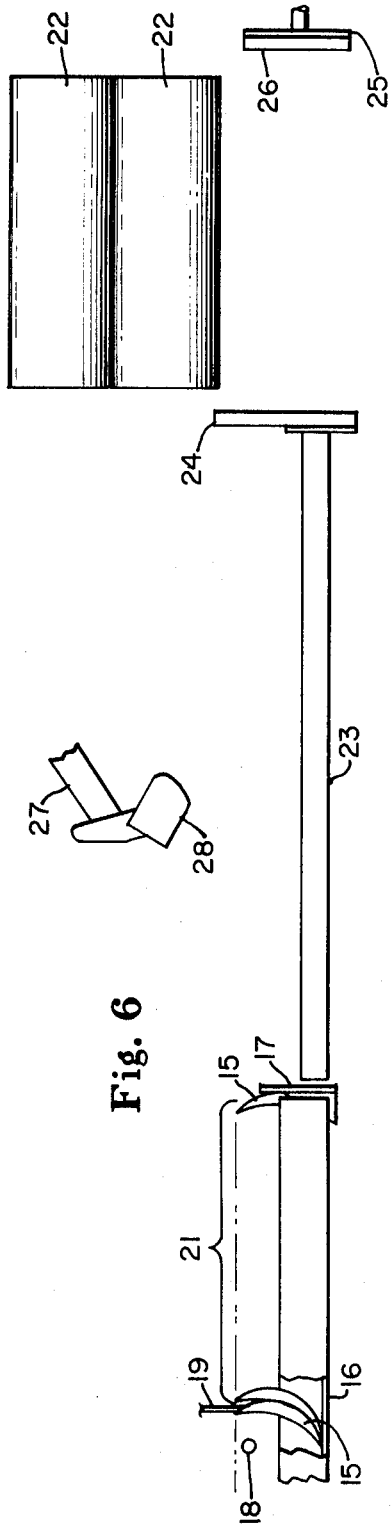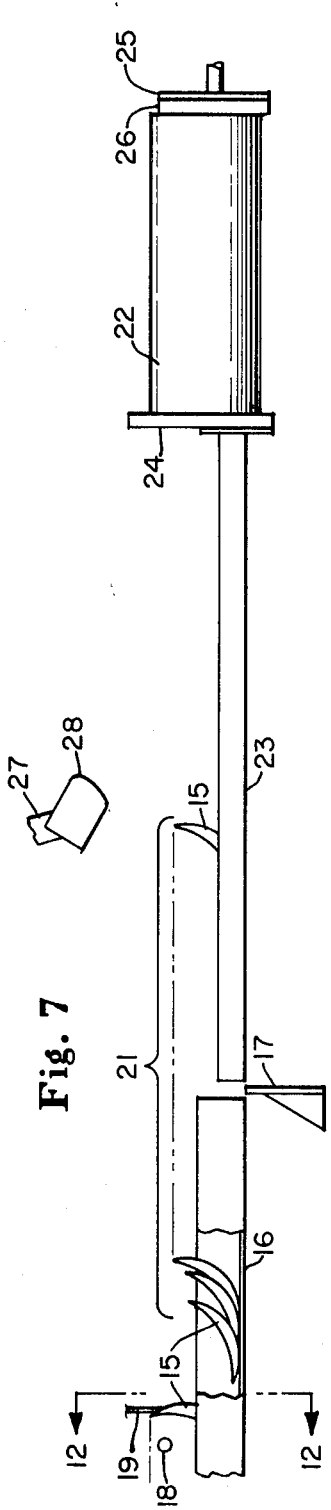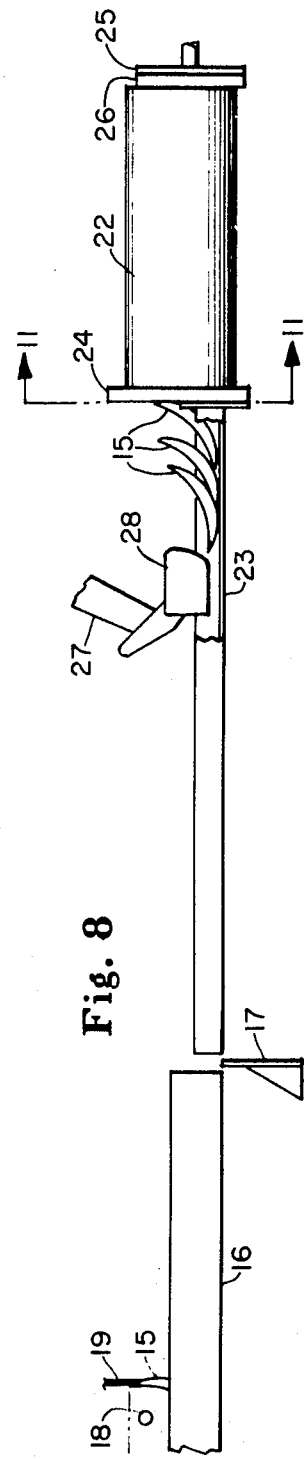

United States Patent Office 3,609,939
Patented Oct. 5, 1971

3,609,939
**APPARATUS FOR THE METERING AND LOAD-
ING OF ARTICLES OF SUBSTANTIALLY UNI-
FORM SIZE AND SHAPE**
Leonard C. Hooper, Springfield Township, Hamilton
County, Howard E. Mathes, Blanchester, and Richard
A. Schaeffer, Wyoming, Ohio, assignors to The Procter
& Gamble Company, Cincinnati, Ohio
Filed June 2, 1970, Ser. No. 42,655
Int. Cl. B65d 5/06, 35/34
U.S. Cl. 53—159                                16 Claims

ABSTRACT OF THE DISCLOSURE

An apparatus for metering and loading uniformly shaped, chip-type snack food products, e.g. potato chips, by forming a stack of predetermined length which is subsequently conveyed into a suitable container. The product is received and fed into shingled relationship on a vibratory metering trough. The chips are held back by a feed stop until a sufficient number have been accumulated to form a metered stack as sensed by a photocell. An overhead metering stop is lowered into the accumulated articles to isolate a predetermined metered stack between the metering stop and the feed stop. The feed stop is lowered whereupon the metered stack is fed forward to a vibratory loading trough and subsequently into a container held against the end thereof. A sweep arm having a resiliently mounted head is activated to push the last several articles from the loading trough into the container in order that the entire metered stack is placed in the container which is then removed for further handling and processing.

BACKGROUND OF THE INVENTION

The apparatus of the invention relates to the art of packaging machinery. More particularly, it relates to a device for receiving and metering a stack of frangible, chip-type products such as potato chips and thereafter forwarding the entire metered stack into a suitable container.

The successful commercial manufacture of chip-type snack food products of uniform shape presents a need for equipment that will satisfactorily handle and automatically pack the finished product in stacks within a suitable commercially salable container. A consideration of available and prior devices indicated the lack of a suitable apparatus that could reliably stack such uniformly shaped chip-type snack food products and place a predetermined number or a metered stack of chips into a container. An apparatus was needed to handle fragile articles such as potato chips with a minimum of breakage. The apparatus had to have the ability for carrying out this function repetitively at relatively high speeds in order that a commercially feasible packaging operation could be established in a manufacturing facility.

SUMMARY OF THE INVENTION

The nature and substance of the invention will be more readily appreciated after giving consideration to its major aims and purposes. The principal objects of the invention are recited in the ensuing paragraphs in order to provide a better appreciation of its important aspects prior to describing the details of a preferred embodiment in later portions of this description.

A major object of the invention is the provision of an apparatus for the metering and loading of frangible chip-type articles of substantially uniform size and shape by receiving the articles from a suitable source, placing them in shingled relationship and thereafter collecting and stacking a predetermined charge of the articles and forwarding them by suitable conveyor means into the open mouth of a container.

Another object of the invention is the provision of an apparatus of the character heretofor described which includes a metering stop capable of entering between a pair of superposed chips or articles without breakage of the product by this separating action.

A further object of the invention is the provision of a feed stop in an apparatus of the character described herein for the purpose of releasing metered lengths of closely stacked chips or articles to a container loading station, the metered stack length being obtained by setting the distance between the metering stop and the feed stop.

Still a further object of the invention is the provision of the apparatus of the above character which includes means for imparting vibration to a container by coupling it to the end of a vibratory feed trough thereby making it possible to load thin chips from the vibrating trough into the container there being a sweep arm provided with a resiliently mounted pusher head to sweep in the last several chips and to consolidate the entire stack within the container.

These and other objects are achieved by the provision of an apparatus for the metering and loading of chip-type articles, e.g. potato chips, which includes suitable means designed to receive and feed a plurality of articles in shingled relationship and a feed stop for holding back the articles to allow them to form a stack on the receiving and feeding means. A metering stop is provided which is located upstream of the feed stop. The metering stop includes means for inserting it between a pair of adjacent articles when the receiving and feeding means are choked to form a metered stack of articles between the feed stop and the metering stop. A container is held in article receiving relationship beyond the receiving and feeding means and in alignment therewith such that upon the removal of the feed stop, the metered stock of articles can be delivered to the container. A device for sweeping the last several chips of the metered stack into the container is provided to complete the filling of the container.

BRIEF DESCRIPTION OF THE DRAWINGS

While the specification concludes with claims particularly pointing out and distinctly claiming the subject matter regarded as forming the present invention, it is believed the invention will be better understood from the following description taken in connection with the accompanying drawings in which:

FIGS. 6 through 10 illustrate schematically the sequence of operations of the apparatus in the metering and loading of the chips into a container.

FIG. 11 is a cross section taken on the line 11—11 of FIG. 8 illustrating a container in chip receiving relationship on the apparatus and showing the entry of chips thereinto.

FIG. 12 is a fragmentary cross section taken on the line 12—12 of FIG. 7 illustrating the metering stop in its metering position.

DESCRIPTION OF THE PREFERRED EMBODIMENTS

Figure 1:
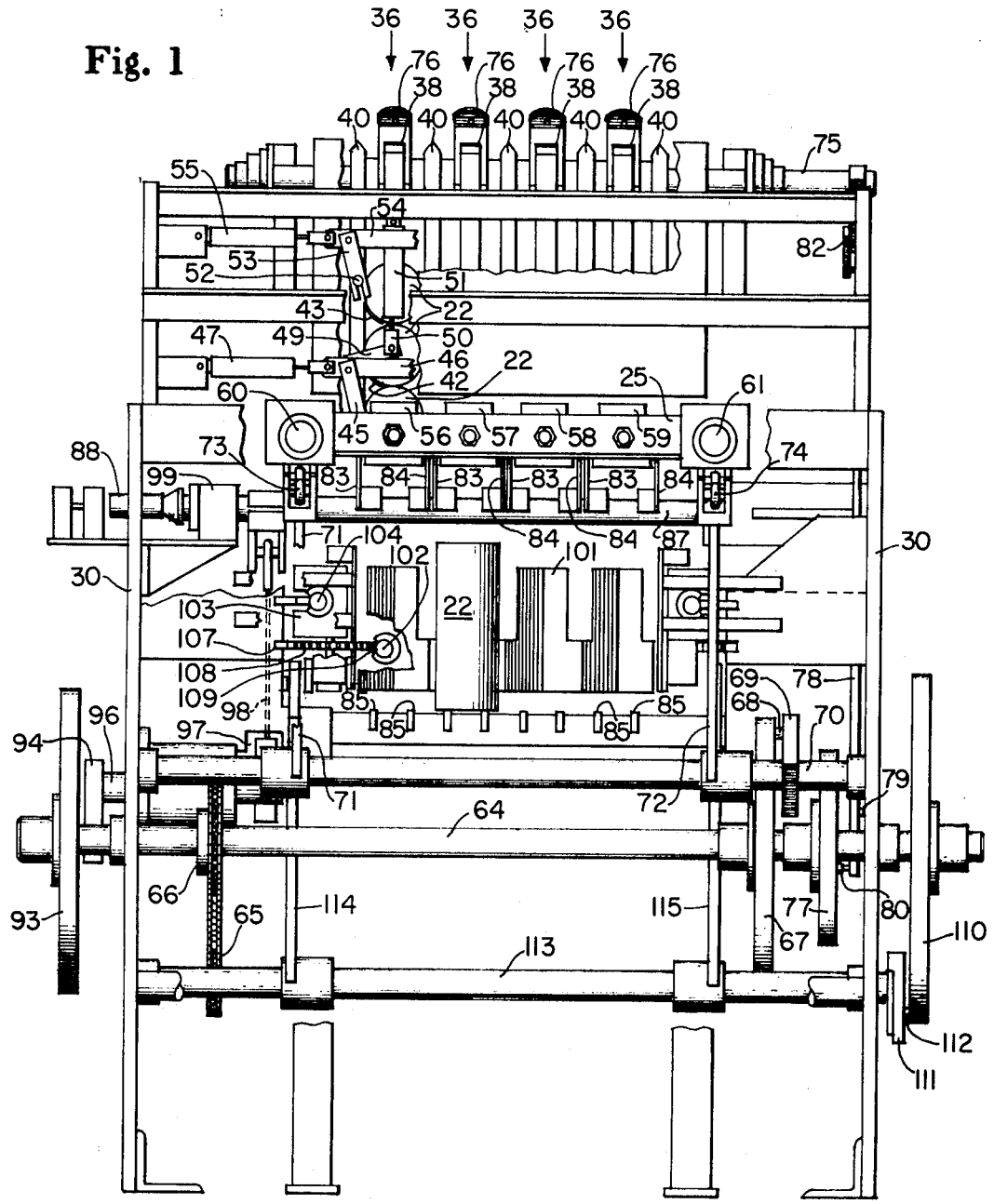
FIG. 1 is a fragmentary end elevation showing a number of the operating components of a preferred embodiment of the invention.

The apparatus of the invention is particularly adapted in the metering and loading of uniformly shaped nonplanar chip-type snack food products such as the potato chips manufactured by the apparatus described and claimed in the application of Robert G. MacKendrick entitled Chip Frying Machine, Ser. No. 763,728, filed on Sept. 30, 1968, and now Pat. No. 3,520,248, which is commonly owned by the assignee of the present application. Purely for convenience, the product described as being packaged in the ensuing description will be referred to as a potato chip, it being understood that the invention is not limited to this particular type of product although it was preferably developed for that purpose. It will also be understood that the invention is particularly adapted in its preferred environment to be operated in conjunction with a machine of the kind described in the aforesaid MacKendrick application although it may readily be adapted to the metering and loading of other types of products, particularly those that are of a chiplike frangible character and those that are preferably packaged in stacks within a suitable container.

The apparatus of the invention is especially adapted for the packaging of potato chips as manufactured by the aforesaid MacKendrick application and inserting a metered stack of the potato chips into a package as described in U.S. Pat. 3,498,798 entitled Packaging of Chip-Type Snack Food Products which was granted to Frederic J. Baur et al. on Mar. 3, 1970, said patent being commonly owned by the assignee of the present application. The type and preferred shape of potato chips handled by the present apparatus is described in considerable detail in said Baur et al. patent and its disclosure is incorporated herein by reference for that purpose.

In order to obtain a better understanding of the detailed operation of the present apparatus, reference will initially be made to FIGS. 6 through 12 inclusive which illustrate schematically the major operating components of the apparatus and their interrelationship. A preliminary explanation of the function of each of these components will make the operation of the entire apparatus more readily apparent. Referring to these illustrations, the potato chips 15 are received from a suitable conveyor or source such as the previously mentioned machine described in the application of Mac Kendrick, whereupon they are conveyed into a shingled relationship by the vibrating metering trough 16. The chips 15 are moved forward in this fashion until they strike the feed stop 17 (FIGS. 9 and 10).

After a sufficient stack of chips 15 has been accumulated to create a choked condition on the metering trough 16, it is sensed by the photocell 18 whereupon the metering stop 19 is actuated and moved downwardly between two adjacent chips 15 (see FIGS. 6 and 12). It will be noted from FIG. 12 that the metering stop 19 which is placed over the metering trough 16 in a relatively small diameter rod, the end of which is radius tapered to a point as at 20. The point 20 is capable of downward movement from its free position to a second position wherein it is interposed about 1 inch between a pair of adjacent chips on the metering trough 16 Insertion between chips is accomplished without causing any damage to the chips 15 that are separated in this manner. A metered stack 21 is then isolated between the metering stop 19 and the feed stop 17. The spacing between the metering stop 19 and the feed stop 17 is such that the stack 21 is of the proper length to fill completely a cylindrical container 22 such as shown in chip receiving position in FIG. 7.

As a next step, the feed stop 17 is lowered as shown in FIG. 7 allowing the metered stack 21 to move forward onto the loading trough 23. Cylindrical containers 22 are fed downwardly by an escapement mechanism (to be hereinafter described) in the manner illustrated in FIG. 6, with their axes in a horizontal plane. A container 22 is shown in chip receiving position in FIGS. 7 and 11 with its open end held against the apertured plate 24 at the end of the loading trough 23 by means of the pusher 25 which has a resilient face 26 bearing against the closed end of the container 22.

Vibratory motion is imparted to the loading trough 23 and this is transmitted to the container 22 when in the chip receiving position of FIG. 7. This causes the metered stack of chips 21 to be conveyed into the container 22 as illustrated in FIG. 8. A sweep arm 27 having a resiliently mounted head 28 is then pivoted downwardly to engage the last several chips 15 of the metered stack 21 in order to complete the filling of the container 22. The resiliently mounted head 28 engages the loading trough 23 during the end portion of its stroke so that it also is vibrated at about the same frequency as the loading trough 23.

As the last chip 15 of the metered stack 21 passes beyond the feed stop 17, the latter is again raised into chip stopping position so that the next metered stack may be formed as illustrated in FIG. 9. The metering process is then repeated by the raising of the metering stop 19 as in FIGS. 9 and 10 while the filled container 22 is removed as shown in FIG. 10 (by means to be hereinafter described) and a new container 22 is brought into chip receiving position as shown in FIG. 7. The cycle may then be continuously repeated as heretofor explained so that successive metered charges of potato chips are filled into each successive container.

An operative embodiment of a preferred apparatus for simultaneously handling four lines of potato chips will now be described as illustrated in FIGS. 1 through 5 inclusive. This embodiment includes all of the working elements needed to package product from four side-by-side lines in accordance with the previously described schematic concept. The principal operating elements for each of the four lines will be essentially identical. For convenience, therefore, a detailed description of the elements of one line will be understood to include duplications of the same elements for each of the other lines. It will be further understood, of course, that the number of lines handled by such an apparatus is immaterial to the disclosed and claimed invention as a person skilled in the art can either increase or decrease the number of lines being simultaneously packaged by the apparatus of the invention.

Figure 2:
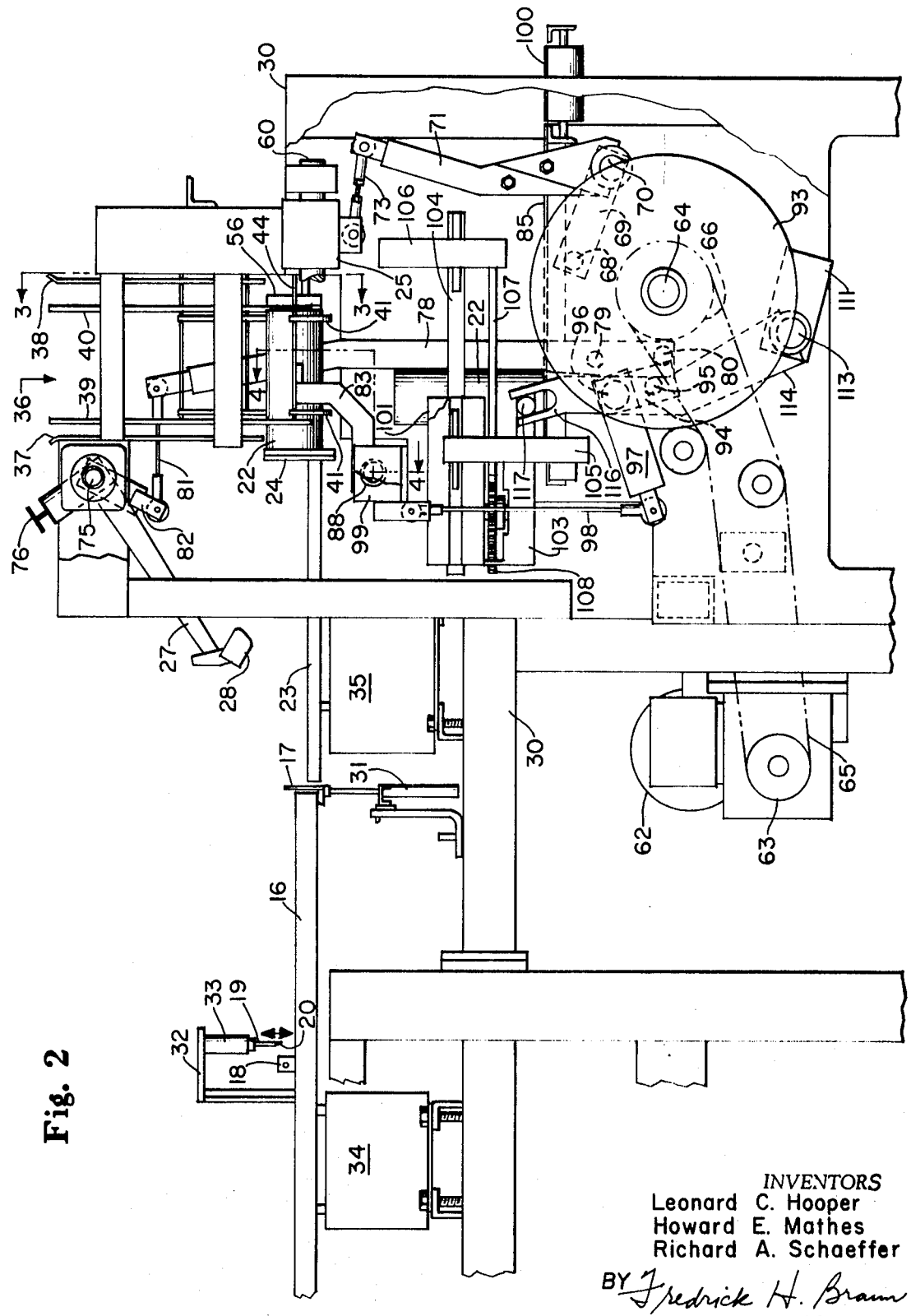
FIG. 2 is a fragmentary side elevation of the apparatus of FIG. 1 showing additional details of the operating components thereof.

Referring now to FIGS. 1 and 2, there is shown side and end elevation views of an operative apparatus which is supported by the frame 30 and includes means for receiving and feeding a plurality of chips in shingled relationship such as the metering trough 16. Feed stop means for holding back the potato chips are provided in the form of the feed stop 17 mounted for reciprocating movement at the end thereof. A means for controlling the movement of the feed stop 17 is provided by the double acting air cylinder 31 suitably mounted for support on the frame 30.

Metering stop means are provided upstream of the feed stop which may preferably take the form of the metering stop 19 suspended from the member 32 which is supported by the frame 30. Movement of the metering stop 19 is controlled by the double acting air cylinder 33 which is suitably actuated by a conventional control so as to move the metering stop from a free position (FIG. 9) to a second position wherein it is interposed between adjacent chips 15 (FIG. 6). As previously indicated, the end of the metering stop 19 is preferably radius tapered to a point as at 20.

The metering trough 16 and the loading trough 23 are preferably vibrated, respectively, by the vibratory elements 34 and 35. The vibratory elements 34 and 35 are designed to move the chips to the right, as viewed in FIG. 2, thus assisting in the accumulation of a metered stack 21 between the feed stop 17 and the metering stop 19 and further assisting in conveying the metered stack 21 into the container 22. The vibratory elements 34 and 35 can be of the type made and sold commercially by the Eriez Manufacturing Company of Erie, Pennsylvania; the details of the vibratory elements being further illustrated and described in U.S. Pat. 2,895,064.

The present apparatus includes suitable means for feeding individual containers 22 into position at the end of the loading trough 23 and thereafter clamping the container 22 against the apertured plate 24 at the end of the trough 23 while the chips are being loaded thereinto. The containers 22 are fed into the individual vertical chutes 36 which may include vertical guide members 37 and 38 at the ends thereof and additional vertical guide members 39 and 40 at the sides thereof.

Figure 3:
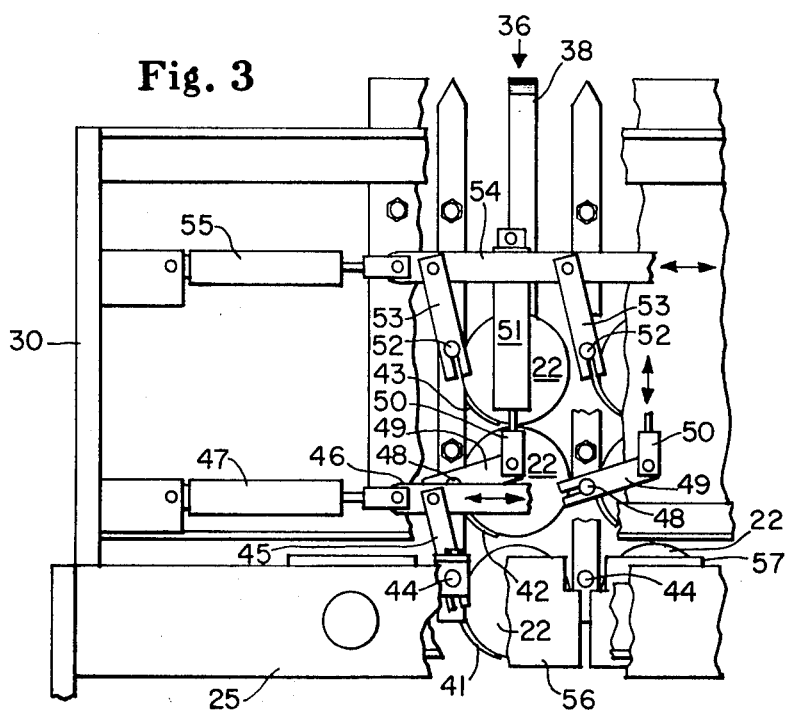
FIG. 3 is a fragmentary end elevation taken on the line 3—3 of FIG. 2 showing the escapement mechanism used in feeding empty containers into operative article receiving relationship on the apparatus.

A series of loading catches is provided in the container chutes 36 which are suitably synchronized and actuated so that individual containers 22 are successively fed into position for receiving a metered stack 21 of chips 15 at the appropriate time in the operating cycle. As best illustrated in FIGS. 2 and 3, the container feed mechanism includes pivoted loading catches 41, 42 and 43 which are shown in their container holding position in the illustration of FIG. 3. Pivoting means are provided for actuating the loading catches 41, 42 and 43 to permit feeding of containers. The loading catch 41 is pivoted by the shaft 44 which is turned by the lever 45 which is, in turn, actuated by the link 46 from the double acting air piston 47 attached to the frame 30. Similarly, the loading catch 42 is pivoted by the shaft 48 which is actuated by the lever 49 which is moved by the link 50 from the double acting air cylinder 51 which is also attached to the frame member 30. The loading catch 43 is pivoted by the shaft 52 which is turned by the lever 53 being actuated by the link 54 from the double acting air cylinder 55 which is attached to the frame 30. It will be understood that a similar mechanism is provided for each of the four container chutes 36 and that the elements and actuating mechanisms thereof will be duplications of those described in connection with the illustration of FIG. 3.

Containers 22 are continuously fed into each of the container chutes 36 whereupon they are initially held back by the loading catch 43. The loading catch 43 is swung into inoperative position by the mechanism operated by the cylinder 55 whereupon the containers 22 drop downwardly and are restrained by the loading catch 42. The loading catch 43 is then returned to its operative position to hold back the containers 22 thereabove whereupon the loading catch 42 is swung into inoperative position by the air cylinder 51 allowing the lowermost container 22 to drop downwardly and be held at its loading position by the catch 41. The sequence of actuation of the loading catches 41, 42, 43 may be repeated and programmed so that individual containers 22 are placed into potato chip receiving position at an appropriate time in the cycle as the apparatus is operated.

As previously indicated, means are provided for holding each container 22 in position against the apertured plate 24 at the end of the loading trough 23 to receive a metered stack of potato chips. The means include a pusher 25 having a resilient face 26. This position of a container 22 is illustrated in FIGS. 7, 8 and 9. The mechanism for carrying out this function as a container 22 is held in position by the loading catch 41 will now be described.

The pusher 25 is shown in FIGS. 1 and 2 as an elongated plate having individual pusher elements 56, 57, 58 and 59 for each line being packaged. The pusher member is horizontally slidable on the guide elements 60 and 61 such that in the inward position, each of the containers 22 is held against an apertured plate 24 (see FIG. 2). When the pusher elements 56, 57, 58 and 59 are retracted, the components of the apparatus are in position to remove filled containers and to receive empty containers by means of the escapement mechanism previously described.

The operating mechanism for reciprocating the pusher member 25 is actuated by the motive power source 62 which may include a conventional motor and reduction gear drive unit which is mounted on the frame 30 having an output sprocket 63 driving the main power shaft 64 which is suitably journalled in the frame 30. The drive from the sprocket 63 may include the chain 65, suitable idlers and a drive sprocket 66 secured to the shaft 64.

A can holder cam 67 is secured to the main power shaft 64. A cam follower 68 engages the track of the can holder cam 67 to control the pivotal movement of an arm 69 secured to the shaft 70 which is journalled at its ends in the frame 30 of the apparatus. Extended arms 71 and 72 are attached to the shaft 70 in spaced relationship as illustrated in FIG. 1. The extended arms 71 and 72 are pivoted in response to movement of the arms 69 and cause reciprocating movement of the pusher member 25 through the link members 73 and 74. Thus on each cycle of the shaft 64 it will be apparent that the pusher member 25 will move inwardly to hold the containers 22 against the apertured plates 24 to permit loading of a metered stack of potato chips whereupon the pusher member 25 is retracted through the previously described mechanism to permit removal of filled containers 22 and the insertion of empty containers to receive the next metered stack.

Means for sweeping the last several potato chips of the metered stack into a container 22 will now be described. This means includes a mechanism for actuating the sweep arm 27. As shown in FIG. 2, the sweep arm 27 includes a resiliently mounted head 28 pivotally mounted at the extremity thereof. Movement of the sweep arm 27 is controlled by the shaft 75 which is journalled in the frame member 30. A spring loaded release knob 76 is provided for the purpose of releasing the sweep pressure exerted by the head 28 at any time due to malfunction in the operative cycle or as desired by the operator.

A chip sweep cam 77 is secured to the main power shaft 64 as best seen in FIG. 1. The cam 77 controls movement of an operating arm 78 (see FIG. 2) which is journalled on the frame 30 by means of the journal shaft 79. The lower end of the arm 78 has a cam follower 80 engaging the cam track within the chip sweep cam 77 so that the arm 78 will be pivoted about the shaft 79 as the chip sweep cam 77 is turned by the main power shaft 64. The upper end of the operating arm 78 is linked to a lever member 81 which in turn operates the arm 82 attached to the shaft 75. Thus, movement of the arm 82 will rotate the shaft 75, and, in turn, operate the sweep arm 27. The mechanism described for actuating the sweep arm 27 is designed to cause it to come into operation at the appropriate time in the cycle so that the last several chips in the metered stack 21 are pushed into the container 22 in the manner that has been more fully described heretofore.

Upon filling of the container 22 and pushing in the last several chips of the metered stack, the pusher member 25 is retracted by the means previously described whereupon the full container 22 is ready to be removed and conveyed away for further processing. The mechanism for removing filled containers 22 will now be described.

Figure 4:
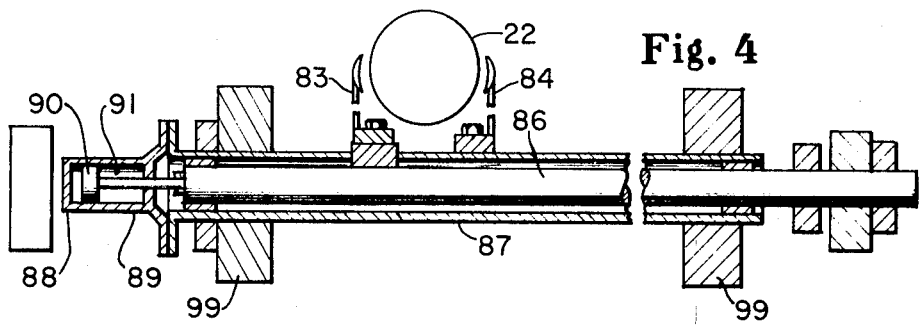
FIG. 4 is a fragmentary elevation in cross section taken on the line 4—4 of FIG. 2 showing the mechanism for actuating the clamp arm used in grasping and removing the filled containers, the parts being shown with the clamp arms in their open relationship.
Figure 5:
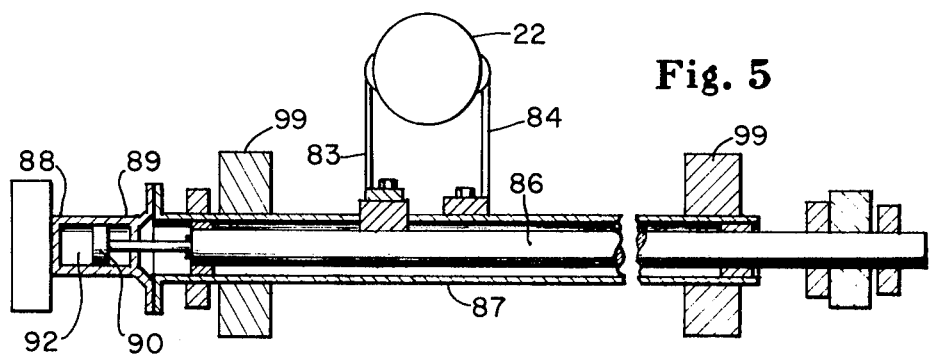
FIG. 5 is a cross section similar to FIG. 4 showing the same elements of the apparatus with the clamp arms in their clamped relationship on a filled container.

The mechanism for removing the containers includes a plurality of pairs of clamping arms 83 and 84 as seen in FIGS. 1, 4 and 5, each pair being designed to grip a container 22 and thereafter remove it for placement upon the support slide elements 85 as shown in FIG. 1. Clamping arms 83 and 84 are respectively secured to the telescoping shafts 86 and 87. A double acting air cylinder 88 is provided such that its housing 89 is secured to the outer shaft 87 and its piston 90 is secured to the inner shaft 86. Thus on entry of air into the chamber 91, the clamp arms 83 and 84 are spread whereas on entry of air into the chamber 92 the clamp arms 83 and 84 are moved into engagement with the container 22 as illustrated in FIG. 5.

The clamp arms 83 and 84 are mounted for pivotal movement in stationary bearings attached to the frame 30 so that after the container 22 is clamped, it can be lowered and deposited in upright position upon the support slide elements 85 illustrated in FIG. 1. In FIG. 2, the clamp arms are shown in their uppermost position, ready to grasp a filled container. Upon actuation of the clamp arms 83 and 84 into engagement with a container 22, a mechanism for pivoting the arms 83 and 84 is actuated to lower the filled containers from their chip receiving position. This mechanism includes a clamp arm pivot cam 93 secured to the main power shaft 64 and a cam arm 94 having a follower 95 engaged in the track of theh cam 93. The arm 94 is secured to a shaft 96 which is journalled in the frame 30. The lever 97 (FIG. 2) is also secured to the shaft 96 and has its other end pivoted to the link 98 which is, in turn, operatively connected to the member 99 for the purpose of pivoting the clamp arms 83 and 84.

Removal of a filled container 22 is accomplished by a sequence of operations in which the clamp arms 83 and 84 are initially placed in clamping relationship on a filled container 22 as illustrated in FIG. 5. Thereupon, rotation of the cam 93 causes the linkage to pivot the clamp arms 83 and 84 about 90° as viewed in FIG. 2 such that the filled container 22 is deposited upon the support slide elements 85. The clamp arms 83 and 84 are then disengaged as illustrated in FIG. 4 whereupon the clamp arms are returned to their initial position to engage and remove the next filled container.

Upon deposit of each filled container 22 on the support slide elements 85, a suitable mechanism is provided to push the filled containers 22 laterally across the support slide elements 85 until they are deposited upon the conveyor 100 where the filled containers 22 are transported to other equipment for additional handling and/or processing. The pusher mechanism for moving the containers 22 laterally will now be described. This mechanism includes a pusher element 101 as illustrated in FIGS. 1 and 2 which is supported on the rod 102 there being a corresponding rod on the right side (not shown) as viewed in FIG. 1. The rod 102 is supported for sliding movement in the side frame 103 which is slidably movable on the main rod 104 which is, in turn, supported from the stationary members 105 and 106. A second side frame (not shown) equivalent to the side frame 103 and with equivalent actuating mechanism is provided on the other end of the pusher element 101. A stationary rack 107 is also supported by the members 105 and 106. The rack 107 is engaged by the gear 108 which is journalled in the side frame 103 such that it also engages a rack element 109 cut in the rod 102 as viewed in FIG. 1.

Lateral movement of the side frame 103 is controlled by the full can pusher cam 110 shown in FIG. 1 which is also secured for rotation on the main power shaft 64. A cam arm 111 is provided with a follower 112 engaged in the cam track (not shown) of the cam 110. The other end of the arm 111 is secured to the shaft 113 for rotation thereof. The shaft 113 is journalled in the frame 30. Arms 114 and 115 are secured to the shaft 113 for rotation therewith such that the arm 114 has a forked end at 116 which is in sliding engagement with the pin 117 secured to the side frame 103. The upper end of arm 115 is provided with a similar structure.

Thus, on pivotal movement of the shaft 113 caused by the pusher cam 110, the arms 114 and 115 cause movement of the frame 103 and its equivalent frame (not shown) to the right as viewed in FIG. 2. This, in turn, will move the pusher element 101 through the intermediary of the gear 108 engaging the rack 107 and the rack element 109 on the rod 102. The resultant movement of the pusher element 101 causes the filled containers 22 to move from the position at which they were deposited by the clamp arms 83 and 84 to the conveyor 100 from where they can be moved away from the apparatus for further processing as desired.

It will be clear to those skilled in the art that the various activating elements of the apparatus can be appropriately adjusted so that their operation is carried out in a particular timed sequence to achieve the desired objectives of the invention. While particular devices have been illustrated for actuating the various operative elements of the apparatus, it will be apparent to the skilled worker that various forms of mechanical, pneumatic, hydraulic or electrical devices may be employed for the various operating components of the device and that the actuating or operating circuits for these components will vary accordingly. However, with these teachings as a guide, the necessary means for carrying out the objectives of the invention will be readily apparent to the skilled worker in the art.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed as new is:

1. Apparatus for the metering and loading of articles of substantially uniform size and shape comprising the combination of:
   (a) means for receiving and feeding a plurality of articles in shingled relationship, feed stop means at one end of said receiving and feeding means for holding back said articles and allowing them to form a stack of superposed articles on said receiving and feeding means,
   (b) metering stop means located upstream of said feed stop means, means for inserting said metering stop means between a pair of adjacent articles when said receiving and feeding means is choked to form a metered stack of articles between said feed stop means and said metering stop means,
   (c) means for holding a container in article receiving position beyond said receiving and feeding means and in alignment therewith,
   (d) means for removing said feed stop means to release said metered stack of articles for delivery to said container, and
   (e) means for feeding said stack of articles into said container including means for sweeping the last several articles in the metered stack of articles into said container to complete the filling thereof.

2. An apparatus as claimed in claim 1 wherein said receiving and feeding means comprises a metering trough and means for vibrating said metering trough to cause forward movement of said articles thereon.

3. An apparatus as claimed in claim 1 wherein said metering stop means comprises a rod having a pointed end and means for reciprocating said rod from a free position to a second position wherein it is interposed between a pair of adjacent articles.

4. An apparatus as claimed in claim 1 wherein said container holding means comprises a reciprocating pusher for engaging the base of the container and holding it in article receiving relationship at one end of said article receiving and feeding means.

5. An apparatus as claimed in claim 1 wherein said sweeping means includes a pivoted sweep arm having a resiliently mounted head attached at its extremity and means for pivoting said sweep arm such that the resiliently mounted head sweeps in the last several articles in the metered stack.

6. An apparatus as claimed in claim 2 wherein said metering stop means comprises a rod having a pointed end and means for reciprocating said rod from a free position to a second position wherein it is interposed between a pair of adjacent articles.

7. An apparatus as claimed in claim 2 wherein said container holding means comprises a reciprocating pusher for engaging the base of the container and holding it in article receiving relationship at one end of said article receiving and feeding means.

8. An apparatus as claimed in claim 2 wherein said sweeping means includes a pivoted sweep arm having a resiliently mounted head attached at its extremity and means for pivoting said sweep arm such that the resiliently mounted head sweeps in the last several articles in the metered stack.

9. An apparatus as claimed in claim 3 wherein said container holding means comprises a reciprocating pusher for engaging the base of the container and holding it in article receiving relationship at one end of said article receiving and feeding means.

10. An apparatus as claimed in claim 3 wherein said sweeping means includes a pivoted sweep arm having a resiliently mounted head attached at its extremity and means for pivoting said sweep arm such that the resiliently mounted head sweeps in the last several articles in the metered stack.

11. An apparatus as claimed in claim 4 wherein said sweeping means includes a pivoted sweep arm having a resiliently mounted head attached at its extremity and means for pivoting said sweep arm such that the resiliently mounted head sweeps in the last several articles in the metered stack.

12. An apparatus as claimed in claim 6 wherein said container holding means comprises a reciprocating pusher for engaging the base of the container and holding it in article receiving relationship at one end of said article receiving and feeding means.

13. An apparatus as claimed in claim 6 wherein said sweeping means includes a pivoted sweep arm having a resiliently mounted head attached at its extremity and means for pivoting said sweep arm such that the resiliently mounted head sweeps in the last several articles in the metered stack.

14. An apparatus as claimed in claim 7 wherein said sweeping means includes a pivoted sweep arm having a resiliently mounted head attached at its extremity and means for pivoting said sweep arm such that the resiliently mounted head sweeps in the last several articles in the metered stack.

15. An apparatus as claimed in claim 9 wherein said sweeping means includes a pivoted sweep arm having a resiliently mounted head attached at its extremity and means for pivoting said sweep arm such that the resiliently mounted head sweeps in the last several articles in the metered stack.

16. An apparatus as claimed in claim 12 wherein said sweeping means includes a pivoted sweep arm having a resiliently mounted head attached at its extremity and means for pivoting said sweep arm such that the resiliently mounted head sweeps in the last several articles in the metered stack.

References Cited

UNITED STATES PATENTS

| | | | |
|---|---|---|---|
| 2,745,232 | 5/1956 | Alfandre et al. | 53—126 |
| 2,747,352 | 5/1956 | Whitecar | 53—159 |
| 3,485,009 | 12/1969 | Cook | 53—61 |

THERON E. CONDON, Primary Examiner

R. L. SPRUILL, Assistant Examiner

U.S. Cl. X.R.

53—61, 250